United States Patent
Gardiner et al.

(10) Patent No.: US 6,362,818 B1
(45) Date of Patent: Mar. 26, 2002

(54) SYSTEM AND METHOD FOR REDUCING THE RENDERING LOAD FOR HIGH DEPTH COMPLEXITY SCENES ON A COMPUTER GRAPHICS DISPLAY

(75) Inventors: Harold D. Gardiner, Sandy; Russell J. Urry, West Jordan, both of UT (US)

(73) Assignee: Evans & Sutherland Computer Corporation, Salt Lake City, UT (US)

( * ) Notice: Subject to any disclaimer, the term of this patent is extended or adjusted under 35 U.S.C. 154(b) by 0 days.

(21) Appl. No.: 09/256,818

(22) Filed: Feb. 24, 1999

Related U.S. Application Data

(63) Continuation-in-part of application No. 09/003,938, filed on Jan. 1, 1998, now Pat. No. 6,052,125.

(51) Int. Cl.⁷ .............................................. G06T 17/00
(52) U.S. Cl. ........................................ 345/421; 345/426
(58) Field of Search ............................... 345/418, 421, 345/422, 426, 424, 425, 427

(56) References Cited

U.S. PATENT DOCUMENTS

| | | | |
|---|---|---|---|
| 4,825,391 A | | 4/1989 | Merz |
| 5,359,704 A | * | 10/1994 | Rossignac et al. .......... 345/422 |
| 5,471,567 A | * | 11/1995 | Soderberg et al. .......... 345/433 |
| 5,604,849 A | * | 2/1997 | Artwick et al. ............. 345/423 |
| 5,734,386 A | | 3/1998 | Cosman |
| 5,821,944 A | | 10/1998 | Watkins |
| 5,870,097 A | * | 2/1999 | Snyder et al. .............. 345/426 |
| 5,923,333 A | * | 7/1999 | Stroyan ..................... 345/422 |

* cited by examiner

Primary Examiner—Cliff N. Vo
(74) Attorney, Agent, or Firm—Thorpe North & Western, LLP

(57) ABSTRACT

This invention relates generally to the field of computer graphics display, and more particularly to reducing the amount of time needed to render complex virtual scenes on a computer graphics display. This invention combines the advantages of the prior art methods of list priority and depth buffering (e.g. Z-buffering) with new simplified and enhanced full buffer processes. In one embodiment, a simplified full buffer arrangement enables the elimination of rendering primitives prior to pixel shading for regions of the screen which have previously been covered by closer primitives. Another embodiment provides for an enhanced full buffer that combines the coverage of a previously rendered primitive in a partial buffer and associates it with a current primitive to cover pixel arrays. This enhanced full buffer technique enables the use of higher order model primitives such as strips, fans and meshes, to increase the effectiveness of the full buffer by allowing more than one primitive to combine to fill a scanned pixel region on the screen.

41 Claims, 4 Drawing Sheets

SYSTEM AND METHOD FOR REDUCING THE RENDERING LOAD FOR HIGH DEPTH COMPLEXITY SCENES ON A COMPUTER GRAPHICS DISPLAY

CROSS-REFERENCE TO RELATED APPLICATIONS

This application is a continuation-in-part of application Ser. No. 09/003,938 which was filed on Jan. 1, 1998 now U.S. Pat. No. 6,052,125.

BACKGROUND

TECHNICAL FIELD

This invention relates generally to the field of computer graphics display, and more particularly to reducing the amount of time needed to render complex virtual scenes on a computer graphics display.

BACKGROUND OF THE INVENTION

Computers have been used for many years to do image and graphics generation. In recent years these computer-generated graphics have become more and more sophisticated. As the power of computer equipment increases, the users' expectation of what the computer should do also increases. One area that has been accelerating rapidly is computer-generated imagery with increasing scene complexity. Computer users have come to expect more realism that generally means that there are more objects and more lighting and texture processing on those objects.

Complex images and scenes are modeled in three-dimensional space in the computer memory and manipulated accordingly. A complex three-dimensional shape is broken down into basic graphic shapes called primitives. Modeling techniques and tools describe the virtual environment with primitives. Primitives include such things as polygons, meshes, strips and surface patches. Some graphics architectures employ optimized algorithms for handling simple primitives such as dots, lines and triangles. Before a three dimensional scene can be viewed by the user it must be translated from the three dimensional view in the computer to a two dimensional view which can be displayed on a two dimensional screen or monitor.

The process of translating the three-dimensional image to a flat display device is called rendering. The rendering process takes place in the graphics hardware or software and converts primitives into a two-dimensional array of graphical points. These points are known as pixels and are stored in computer memory in a frame buffer before they are drawn on the screen. The frame buffer is a rectangular two-dimensional array and is M by N pixels, where M and N depend on the display system. The computer draws multiple frames consecutively at many frames per second to animate the virtual environment being viewed. Graphics display techniques can also incorporate sub-pixels that are logical sub-divisions of a pixel. The color values of the sub-pixels are later combined or averaged together to form an actual pixel. Generally, techniques that can be applied to pixels can also be applied to sub-pixels.

The number of frame buffer pixels which must be displayed is constant for any given computer screen. However, the number of pixels that must be computed in order to fill the frame buffer is highly dependent on the complexity of the virtual scene. For each actually displayed pixel, a number of pixels may be rendered based on the number of primitives that cover the pixel in the scene. In other words, a calculation is made for each primitive graphic object that is in the line of sight of the pixel. The ratio of the number of rendered pixels relative to the number of displayed pixels is known as the average pixel depth complexity. This indicates the average number of primitives that cover each pixel on the screen. Depth complexity numbers indicate the amount of processing or work it takes to create each image, and these numbers vary greatly depending on the modeled environment and the viewer's current position in that environment.

For example, in a rendering of a region of mountainous terrain covered with trees as viewed from above, the average depth complexity lies somewhere between one and two. The peak depth complexity may be two. Pixels displaying the terrain only need one calculation, while pixels covered by a tree need two calculations, one for the tree and one for the terrain. If the viewer's position is moved down within the trees, with a line of sight toward the horizon, the depth complexity numbers will increase dramatically. If the forest is quite dense, the average depth complexity may go up into the tens while the peak may even approach the hundreds. As the model complexity increases the depth complexity numbers will also increase.

Many pixels rendered in high depth complexity scenes never contribute to the final image. This occurs because the primitives to which they belong are located farther away and behind other primitives in the scene and are therefore not visible to the user. The additional unused calculations increase the amount of hardware or time required to render a given scene.

As the virtual enviromnent's complexity increases, the demand on the rendering process also increases. If the rendering is done in accelerated graphics hardware, it can become quite costly because of the large number of calculations required to be implemented in hardware. For software based rendering systems, the rendering time can become very slow. In either case, if the rendering is too slow, the movement of the display image becomes disjointed or choppy when the image is displayed.

Various techniques have been used to reduce the amount of hardware or computing time needed to render increasingly complex scenes. These techniques attempt to reduce the number of pixels rendered which do not contribute to the final image. Most current systems use a brute-force approach to converting modeled primitives into viewable pixels. Each primitive is taken individually and projected from the three-dimensional model coordinates into a two-dimensional frame buffer space in memory. Then the process calculates which pixels within the frame buffer the primitive touches. Computing which pixels are touched is a process known as scanning. Scanning selects each pixel and computes its color as determined by the modeled attributes of the primitive. Computing the pixel color can be very complex if sophisticated lighting algorithms and textures are being used. Typical factors contributing to the pixel's color include the modeled color, light sources shining on the primitive, texture, anti-aliasing, and visibility conditions.

A mechanism must also be provided to determine which primitive in the scene should be visible for any given pixel (or sub-pixel if anti-aliasing techniques are employed). This process is often referred to as hidden-surface-removal. For example, all the primitives or surfaces which are hidden by other surfaces within the scene are removed. Common hidden-surface-removal techniques include the painter's algorithm, list-priority algorithms, scan-line algorithms, and Z-buffering (or depth buffering).

Each of these hidden-surface-removal techniques has it own advantages or disadvantages.

For a number of reasons, the Z-buffer method has now become a very popular choice. Most of the other approaches require special modeling techniques and support data structures to render the image properly. The Z-buffer approach eliminates most of these constraints and simplifies the modeling process. In the Z-buffer approach, the visible primitive or surface at each pixel is the primitive with the closest Z value. The Z value is basically the depth of the primitive in the viewed scene. As each primitive is rendered, this Z parameter can be computed for each pixel touched. The frame buffer is also expanded to store the Z depth, along with storing the pixel color. As each new primitive is processed, the new Z depth can be compared with one already stored in the frame buffer. The frame buffer only keeps the pixels rendered for the primitive closest to the observer.

A major disadvantage of the Z-buffer is that all of the color shading calculations are performed before the depth test is done. Pixels are only discarded by the frame buffer circuit after the color shading calculation is done. This requires a lot of expensive or time consuming calculations to be performed with no final contribution to the image on the screen.

Other hidden-surface-removal strategies have developed more cost effective architectures. An example is the list-priority approach, where the primitives are rendered in a front-to-back order. By recording which pixels (or pixel arrays) are filled up by primitives as they are rendered, later primitives can be tested against this record. This test avoids wasted time processing the primitive against pixels that are already full. Simple structures can be built to maintain and test against this full record, throwing out pixels before the expensive color shading calculations are performed. Thus, even though the depth complexity of the scene may be quite high, many of the pixels that would be thrown away are simply skipped because of this test.

One major disadvantage of the list-priority approach is that primitives must be modeled in such a way as to guarantee that they can be sorted into priority order. In some cases, this is extremely difficult. The list-priority approach also does not support the notion of interpenetrating primitives.

In general, the various hidden-surface-removal techniques provide either an efficient rendering architecture at the expense of complex modeling (e.g., the list-priority approach), or they simplify the modeling process at the expense of rendering efficiency (e.g., the Z-buffer).

Some recent systems have combined the "sort and record" schemes used previously by list-priority machines with the distinct modeling advantages of Z-buffered systems. This approach works well, but it is extremely expensive in terms of hardware and computation time. First, large database sorting methods are used to get the primitives in approximately a front-to-back order. Z-buffer techniques are used to do the final resolution of which primitive covers each pixel. The simple fill record used by the list priority architecture is replaced with a more complex depth-based full record.

State of the art graphics systems which have utilized a full buffer have performed a full buffer update process by examining every pixel (and should be considered to include sub-pixels) in a pixel array within a selected portion or region of the frame buffer. A comparison is made of the depth value for every pixel to determine the maximum depth within the array. This approach is very costly (in time or hardware) since many pixels must be accessed and compared in order to determine whether the pixel array is completely covered by primitives and at what maximum depth. Once the region is completely covered, it can be marked full, regardless of how many primitives it took to cover it If the new primitive's depth is farther than that recorded in the full record, that particular array of pixels need not be rendered for the new primitive.

The memory and controllers used for database sorting, the minimum and maximum depth calculations, and the depth based full buffer all add substantially to the cost of such a hybrid system. The advantages gained by such an approach are particularly of value for applications requiring true real-time performance since the rendering load will be much more level than on a system without such capabilities. Without a means to skip filled regions, the rendering load will be directly proportional to the depth complexity of the scene. By employing these "full record" schemes, the rendering load is more directly tied to the screen's resolution and not so much to the orientation of the database. Unfortunately, the approach of combining a Z-buffer and a depth-based full record is far too costly for mainstream graphics systems.

OBJECTS AND SUMMARY OF THE INVENTION

An object of this invention is to provide cost-effective, enhanced methods to reduce the pixel rendering load when generating a synthetic scene on a computer graphics display.

Another object of this invention is to provide a simplified full buffer architecture that eliminates the rendering of covered pixel arrays for primitives prior to expensive pixel shading operations.

Another object of this invention is to enhance the full buffer architecture so that it significantly improves the efficiency of the rendering process, by reducing the hardware or computing time required to render a graphics scene.

It is another object of this invention to improve the fill buffer architecture by expanding on the types of scene modeling techniques that can benefit from selective pixel rendering.

Another object of this enhanced full buffer architecture is to provide a mechanism to help balance the geometric transformation and pixel rendering loads through using the full buffer.

The present invention provides a simplified full buffer architecture to reduce the pixel rendering load across a wider range of complex scenes by eliminating the rendering of pixel arrays for covered primitives prior to pixel shading. Another aspect of the present invention provides a method for detecting multiple primitives that together fill a pixel region. Thus, higher order model primitives such as strips, fans, quadrilaterals and meshes, can be used in combination to increase the effectiveness of the full buffer by being enabled together to fill a scanned pixel region on the screen. A new system or method is also provided which enables skipping already full regions to be used on models that consist of numerous layers of coincident polygons. Coincident primitives may be coplanar (i.e. stripes on a flat runway) but do not have to be (i.e. decal on a sphere). This is a significant benefit since layers of coincident polygons have a tendency to dramatically increase depth complexity.

Another aspect of the first embodiment of the present invention is related to finding the closest or nearest point within a pixel array stored in the full buffer. Finding the closest or nearest point is usefull to test when certain pixel arrays do not require processing and are thus bypassed. It is also useful to determine the furthest point within a pixel array to store back in the full buffer. The furthest point is the opposite corner of the primitive relative to the closest point. The furthest point is stored in the fill buffer when non-bypassed primitives fill an array region.

The simplified fill buffer method encounters each new array of pixels during scanning, and a comparison is done between the closest depth of the primitive currently being rendered and the full depth for the pixel array retained in the full buffer. If the closest primitive depth is farther than the full buffer's stored depth, then pixels associated with the primitive within the array will not contribute to the final image and can be skipped. The scan conversion process then seeks the next pixel array in the frame buffer for the primitive, and the process repeats. For example, in a situation where the depth value increases with increased distance from the viewer, if the pixel array encountered during scanning was already filled or covered by a primitive at depth 2 and the primitive currently being rendered was of depth 4, then the pixel array processing would be skipped.

If the closest primitive depth is not farther than the full depth, the complete pixel array must be scanned for this primitive. For each of the scanned pixels, a shade is computed which may include transparency. As the array is scanned, a cumulative record is kept of the primitive's coverage of this array. If the primitive completely covers each pixel (or sub-pixel) of the array, its farthest depth value within the array is stored in the full buffer. This marks the pixel array full at that given depth. The full depth is only stored in the full buffer array if it is closer than the at depth currently found in the full buffer. By checking for full pixel arrays early in the process, the expensive pixel shading operations are not performed for areas that would simply be discarded by the Z-buffer.

The enhanced full buffer feature of the present invention, which allows multiple primitives to combine to cover pixel arrays, is especially advantageous over the simplified full buffer system, where coverage can only be accomplished by a single primitive at a time. In the simplified fill buffer system, full coverage is determined by counting how many pixels are visited within the array by a single primitive and ensuring that all the pixels (or sub-pixels) are filled and opaque. The pixel count does not contain any information as to which pixels had been covered, just how many. This problem becomes even worse when sub-pixels are considered. If the pixel array is not completely covered, the partially covered results are simply discarded. When multiple independent primitives are considered, the problem becomes apparent. There is no way to ensure that the primitives do not overlap and hence cover some pixels more than once and some pixels not at all.

The enhanced full buffer architecture of the present invention takes advantage of the nature of connected primitives. Modeling tools now make significant use of these connected primitives such as triangle fans, strips, or meshes, to model surfaces, buildings and terrain. Rendering hardware often accepts these higher order objects and breaks them down into their constituent triangles. Each triangle (or primitive) of a connected primitive shares a pair of vertices and a corresponding edge-with the triangle that precedes it. The triangle may also share a pair of vertices and a corresponding edge with the triangle that follows it in the connected object. An example is shown in FIG. 1.

It is important that the shared edge has exactly complementary coverage. This means that the pixels (or sub-pixels) along the shared edge are completely covered but each pixel is claimed by only one of the triangles.

The preferred embodiment of the invention shown in FIG. 3 suggests that several triangles of a connected primitive could combine to cover a pixel array. However, this is not always the case. In order for the coverage of multiple connected primitives to be truly complementary, there can be no overlap of any of the primitives involved, as shown in the connected primitive in FIG. 2.

The pixel arrays in the overlap region cannot correctly resolve the coverage and hence erroneous results may occur. It is noted that any pair of two triangles of a connected primitive cannot overlap unless one of them is backfacing (i.e. facing away from the viewer's viewpoint). Normally, the geometric transformations identify and discard backfacing primitives. When backfacing primitives are discarded, the connected primitive is interrupted and a "new" one started with the next frontfacing primitive in the list. As a result, the complementary nature of coverage within connected primitives allows pairs of triangles to combine to fill pixel arrays. This also covers the significant modeling construct known as convex quadrilaterals that are often used to model trees and buildings. It is also noted that the pair of primitives need not lie in the same plane. This allows many other modeled features such as terrains and hillsides that contain connected primitives in different planes to jointly fill pixel arrays.

In summary, one embodiment of the present invention is the simplified full buffer architecture shown in FIG. 3. A method and system are provided for increasing a rate of rendering a synthetic image on a computer graphics display, wherein the synthetic image is generated from a database of a plurality of primitives. The system determines which pixels require processing for each of the plurality of primitives. Then a comparison is made of the depth values of the primitives requiring processing against depth values in a fill buffer to thereby determine whether the pixels in a region require further processing. Next, the system skips shading value calculations for pixels not requiring further processing.

A second embodiment of the present invention is the enhanced full buffer system shown in FIGS. 4 and 5. The second embodiment of the invention makes significant improvements to the skip and recording sections of simplified full buffer architecture shown in the first embodiment. Those improvements are described in the following order: (1) extensions to the full buffer, (2) the addition of a "partial buffer," (3) skipping already filled pixel arrays, and (4) recording pixel arrays as they fill.

The enhanced fill buffer embodiment comprises a computer graphics rendering system for efficiently. rendering three-dimensional scenes of high depth complexity with a graphics display unit. The system bypasses rendering operations for frame buffer regions in which the pixels are completely covered by primitives. The system accumulates coverage of frame buffer regions by both individual primitives and groups of primitives. A full buffer having memory locations is arranged for recording frame buffer regions which are completely covered. Finally, a partial buffer is coupled to the full buffer to enable multiple primitives to combine to fill frame buffer regions.

DETAILED DISCLOSURE OF THE PREFERRED EMBODIMENTS

Reference will now be made to the drawings in which the various elements of the present invention will be given numerical designations and in which the invention will be discussed in greater detail so as to enable one skilled in the art to make and use the invention.

Simplified Full Buffer.

Figure 1:
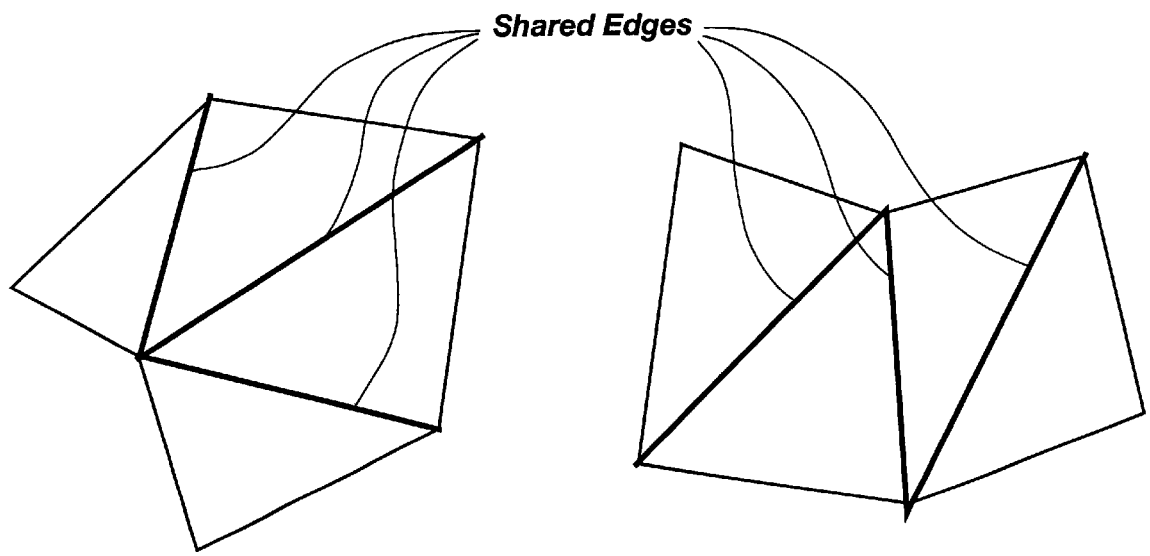
FIG. 1 is an example of connected primitives with two common vertices and a common edge.
Figure 2:
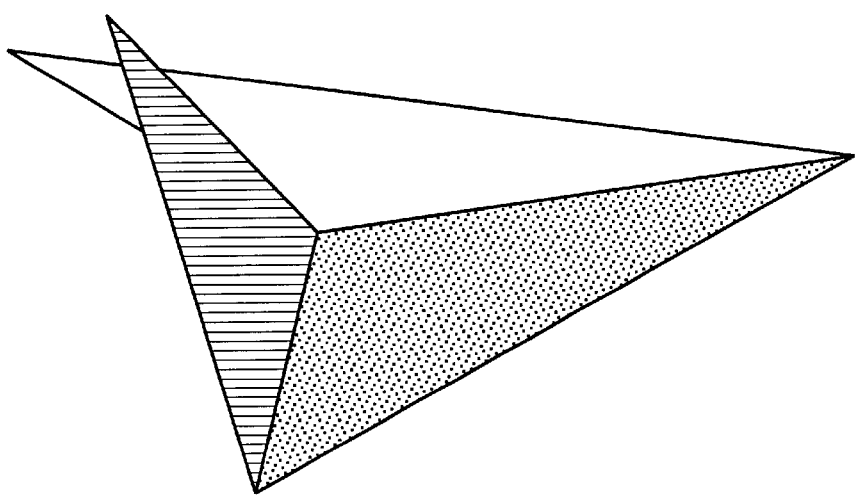
FIG. 2 is an example of overlapping connected primitives.
Figure 3:
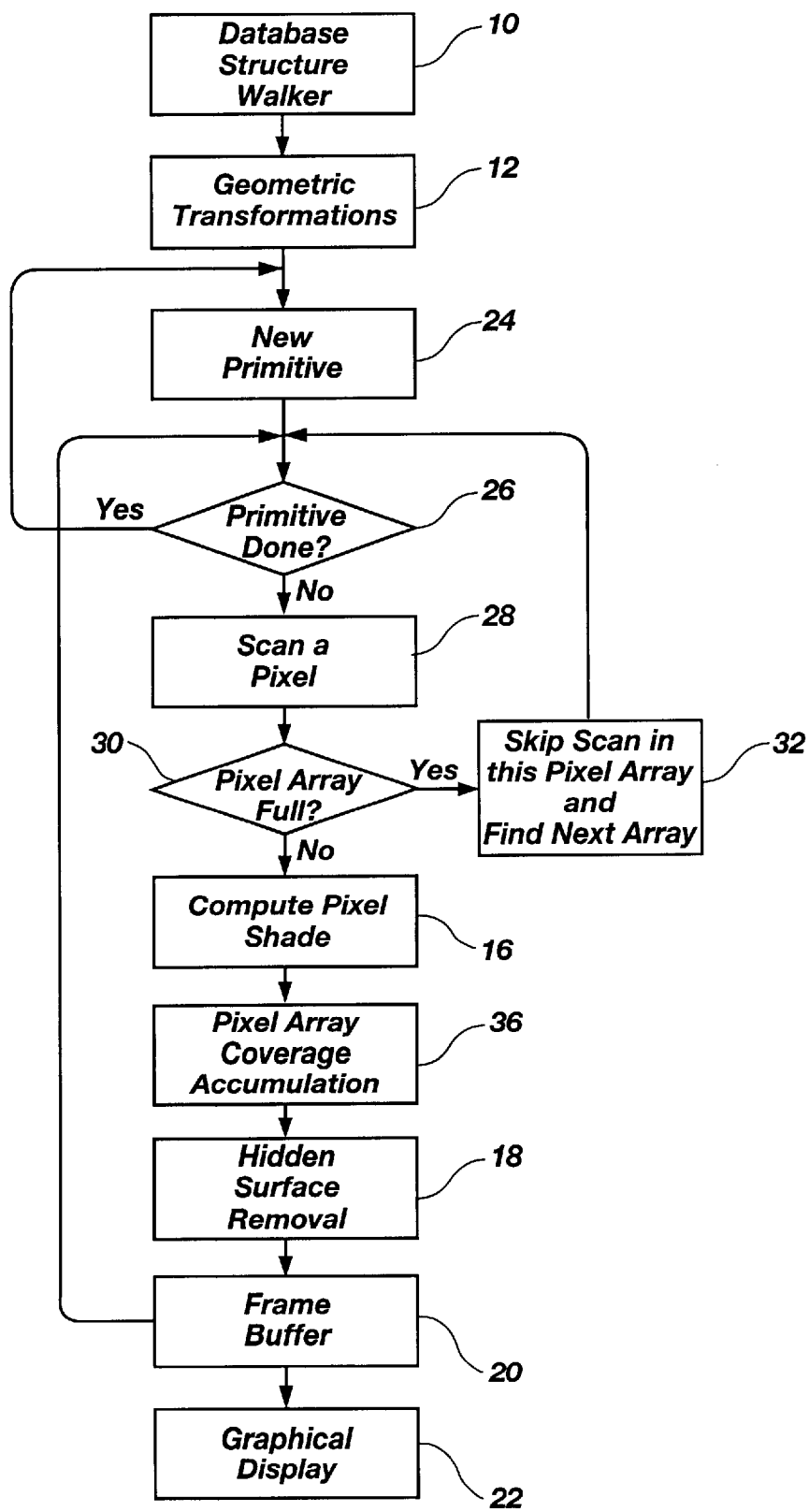
FIG. 3 shows the data flow process for a simplified full buffer technique, in accordance with the present invention.

Referring first to FIG. 3, a simplified full buffer embodiment of the present invention is shown. FIG. 3 is a flow diagram describing the data flow during the process. At step 10 a database structure is evaluated. The geometric transformations are carried out at step 12.

Once the fill buffer has been initialized, the pixel rendering process can begin. Steps 24, 26, 28, 30 and 32 together determine which pixels need processing for a given primitive. As each pixel array of the primitive is identified, it is tested against the full buffer at step 30 to see if it can be skipped. The speed improvement comes from (1) skipping the shading (at step 16) and z-buffer calculations (at step 18) for pixels which can be skipped, and (2) skipping large blocks of pixels at once, as shown at step 32.

In order to carry out the full test described above, particularly in steps 28 and 30, the closest depth to the primitive being rendered must be known. This is calculated in two steps, not shown. First the closest vertex is found and then the closest depth value in the array is determined.

At the first step, the depth value is related to the z coordinate, so the closest point on the primitive is found by comparing the z values at each of the primitive vertices. It is not important to identify which vertex is closest, but just to find its depth value. The second step may refine this depth value to provide improved performance if the primitive is large and covers many pixel arrays. It is extremely helpful to find the closest depth value within each array. Since all triangle primitives are considered planar, it is possible to find the closest depth at one of the array corners. If the closest array corner is further than the closest vertex, the corner's depth value can be used for the full buffer test If the vertex depth value is further, then the vertex depth must be used.

Rather than calculate the depth value at each of the array comers and compare them to determine which is nearest (as is done in the prior art), the primitive's depth slope data can be used to point to the comer that will be the closest. Therefore, some simple sign bit comparisons can be utilized to determine at which corner the depth should be calculated.

Once the closest depth value of the primitive is determined, it can be compared with the depth value already stored in the full buffer for each pixel array requiring processing for the primitive, If the depth value is further than the recorded depth, the array can be skipped. If not, the array must be processed to find the pixel's shading values, after which the entire z-buffer test is executed. As primitives which pass the full buffer test are rendered into the frame buffer, they are monitored to see if they completely fill any of the pixel regions being processed, represented at step 36. If they do, their maximum depth value within the array may be loaded back into the full buffer. If the primitive completely fills the array, and its maximum depth is closer than the value already in the full buffer, the new primitive depth will overwrite the old value. Thus, the full buffer gets refined with closer and closer primitives as needed in order to reject more of the database. This is the reason that primitives processed in a front-to-back order can greatly improve performance. If the closest primitives are rendered first, they will record close-in depth values and thereby cause many of the more distant primitives to be quickly rejected. It should be apparent that partially transparent primitives must not mark the array full, since more distant primitives may still be visible in the pixels.

In order to reduce size and cost of the full buffer, the first embodiment of the present invention only marks a pixel array full if a single primitive completely covers the array, rather than a composite of multiple primitives. Furthermore, rather than compare depth values (often with 32 bit floating point data) at each pixel, a covered flag bit is accumulated as each pixel within the array is scanned. If the primitive completely covers every pixel in the array, the flag will indicate this, and the full buffer can be updated with a new depth value. This sequential comparison of a single "covered" flag is substantially smaller and cheaper than the older approach of doing parallel comparisons of depth values.

Furthermore, rather than compare all of the z-buffer depth values, we simply compute the depth at the appropriate corner of the array. As in the situation of determining the minimum depth, the primitive's slope value can be used to identify which comer will yield the maximum depth value.

Returning again to FIG. 3, it is seen that by checking the full regions early in the method, the expensive pixel-shading step 16 does not have to be performed for areas that would simply be discarded by the z-buffer. Primitives that require rendering are constantly monitored and fed back in the loop to keep the full buffer up to date and thereby maximize the circuit's effectiveness. For pixels that cannot be skipped, the hidden surface removal step 18, frame buffer step 20 and graphical display step 22 are known from prior art architectures.

Figure 5:
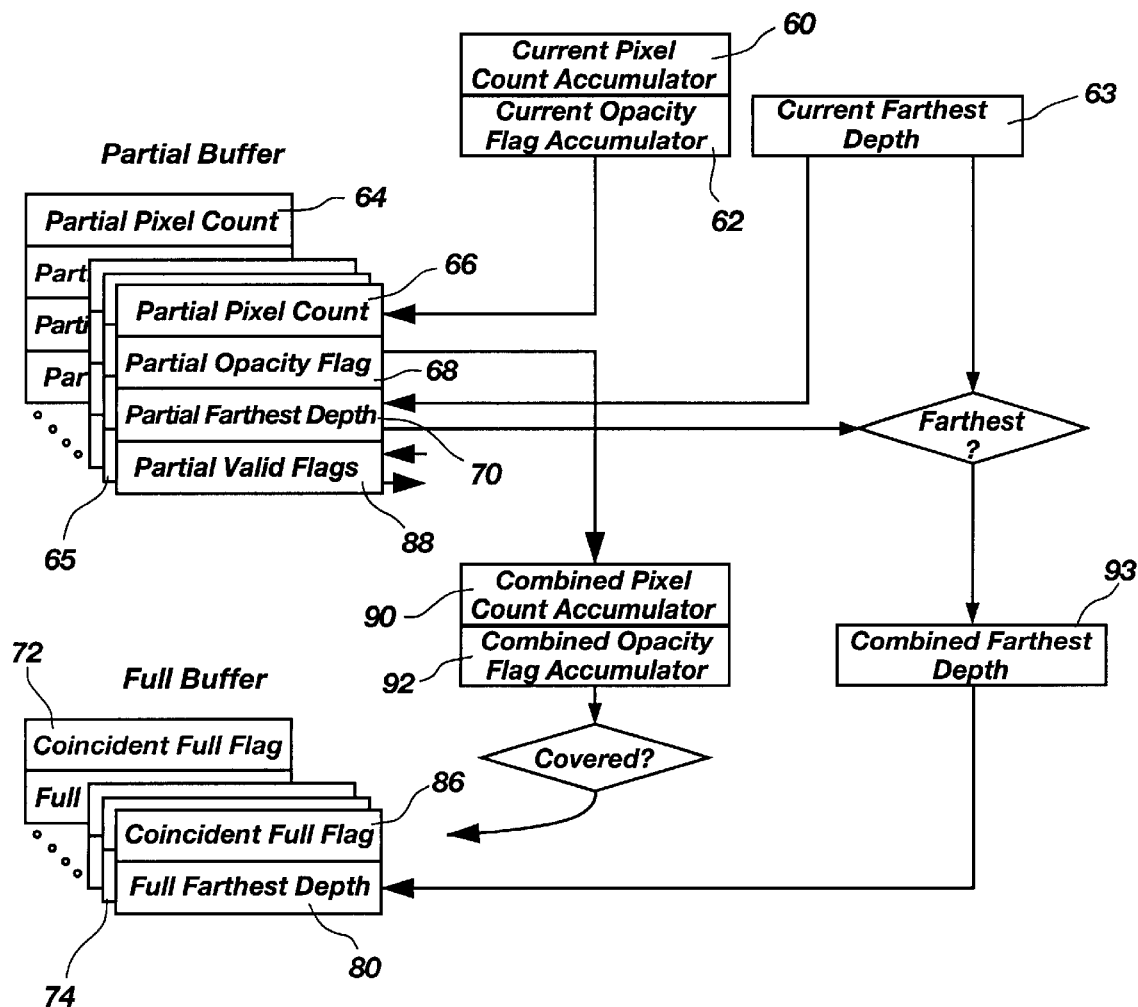
FIG. 5 is a diagram of the full buffer, partial buffer, the combined counters and their associated storage locations and flags in memory of the enhanced full buffer embodiment of the present invention.

Another aspect of the first embodiment of the present invention relates to the full buffer itself In FIG. 5, each memory location 74 in the full buffer 72 represents an array of pixels in, the frame buffer. The exact size of the pixel array is not important to the invention, but it impacts the system's overall performance. Small arrays are easier to fill, but they require larger memory to cover the entire display. They also provide less advantage when it is determined that, for a given primitive, a pixel array can be skipped. A larger pixel array is harder to completely fill, but more pixels can be skipped after each test which provides possible speed improvements. Finding the optimum balance between how fast the arrays fill and how many pixels are skipped is dependent on the database structure being displayed. Some compromise between the two extremes is generally appropriate.

Each full buffer memory location contains a farthest depth value 80 which represents the depth at which the pixel array has been completely covered. The full buffer 72 in the current invention is a re-configurable memory structure. As the frame buffer (display) size increases (i.e. more pixel arrays to store), fewer bits of depth are stored per array. The full buffer 72 is configured to cover as much of the frame buffer as desired with as many bits of depth 80 as desired or as the physical memory allows. In other words, to cover larger display screens, precision may be sacrificed in the depth comparison. This lack of precision never causes a visual error, but may reduce the effectiveness of the circuit in skipping unneeded rendering.

Enhanced Full Buffer.

In addition to a farthest depth value 80, each memory location of the full buffer 72 is extended to include an associated flag bit known as the coincident full flag 86. Each of the coincident full flags 86 can be set and tested individually. However, all of the coincident fill flags 86 of the full buffer are reset simultaneously when a new coincident group of primitives begins rendering. Since this flag is of fixed resolution, the coincident full flag array 86 is not size or precision reconfigurable. Therefore, the number of separate memory locations for the coincident full flag 86 in the full buffer 72 must be equal to the maximum number of pixel arrays supported within a given implementation. When the coincident flag bit 86 is set, it indicates that primitives from a coincident group have filled the associated pixel array. The use of this flag in the process is described in more detail below.

As primitives pass the full test and are rendered into the frame buffer, they are monitored to see if they completely fill any of the pixel arrays being processed. See step 36 in FIG. 3. Enhancements to step 36 that introduce a partial buffer 64 are shown in FIG. 5. When each new pixel array is encountered, the partial coverage information from the previous pixel array is saved or stored in the partial buffer 64 instead of being discarded. The partial buffer 64 consists of memory locations 65 that each correspond directly to memory locations 74 in the full buffer 72 and in turn to a pixel array on the display. Each memory location in the partial buffer 64 contains several items. First, there is a count of the pixels (or sub-pixels) 66 touched by the previous primitive rendered within the array. Second, an opacity flag 68 indicates if all of the pixels (or sub-pixels) in the count were opaque. Third, a farthest depth value 70 represents the farthest depth of the previous primitive within the pixel array. Fourth, a pair of valid flags 88 indicates whether the partial buffer data is part of a valid connected primitive pair.

Because connected primitives are considered in pairs, valid data in the partial buffer 64 can only apply to the next primitive. As the scanning process proceeds from one connected primitive to the next, data in the partial buffer 65 that does not belong to the current pair of primitives being rendered must be invalidated. This is accomplished by using the two valid flags 88 to make it appear as though the partial buffer is double-buffered when there is only one memory location per pixel array. The two valid flags 88 are designated as current and previous.

The current flag validates data written to the partial buffer, while the previous flag validates data read from the partial buffer.

When data is written into the partial buffer 64, the corresponding current valid flag 88 is set which validates the data within the pixel array. As the next primitive within a connected primitive is encountered, all of the current valid flags are transferred to the previous valid flags, and then all of the current flags are reset The previous flag is tested when the partial buffer data is read to ensure the validity of the data. When a new connected primitive is encountered, all of the previous valid flags are reset instead of taking the value of the corresponding current flags, since all the contents of the partial buffer are invalid.

For a given pixel array, data is always read from the partial buffer 64 before a new partial buffer 64 is stored. This read-before-write process means that only the valid flags 88 are double-buffered in the partial buffer. Only a single copy of the pixel count 66, opacity flag 68, and farthest depth fields 70 is necessary.

The farthest depth field of the partial buffer may be reconfigurable in order to accommodate various frame buffer sizes. However, since the pixel count 66, opacity flag 68, and valid flags 88 of the partial buffer are of fixed resolution, this portion of the partial buffer is not reconfigurable. Therefore, the number of separate memory locations in this part of the partial buffer 64 must be equal to the maximum number of pixel arrays supported within a given implementation.

The first step in rendering is to determine which pixels need processing for a given primitive or scanning. As the pixels are selected, they are tested against the full buffer 72 to see if they can be skipped. The speed improvement comes from skipping the shading calculations for pixels that can be skipped AND by skipping large blocks of pixels at once. The full test consists of comparing the closest depth of the primitive within the pixel array to the full depth stored in the fill buffer. If the primitive's closest depth is closer or equal to the full depth, the primitive cannot be skipped.

Coincident primitives can be modeled such that they are rendered in top-to-bottom layer order. If the primitives from the top layer fill (or combine to fill) a pixel array, primitives from other layers in the same coincident group that have the same depth will be scanned again within those pixel arrays. All of these additional pixels scanned from the coplanar group will be removed as part of the subsequent hidden surface removal test and be discarded, but not before all of the expensive shading calculations have been performed.

In this invention, when a coincident primitive fills (or combines with another connected primitive of the same coincident group to fill) a pixel array, not only is the farthest depth 80 put in the full buffer but the corresponding coincident full flag 86 is also set. When subsequent primitives from the same coincident group encounter this pixel array, the coincident fill flag 86 indicates that the array is already full for this group and that scanning can be skipped within this array. The process of the present invention determines whether items are coincident or whether a new coincident group is encountered by using geometric transformations that are well known in the art. All of the coincident full flags 86 are reset when the full buffer 72 is initialized. They also must be reset when the first primitive of each new coincident group of primitives is encountered.

The enhanced full buffer embodiment of this invention expands the full buffer recording process to allow connected primitives to combine their coverage to fill pixel arrays in the full buffer 72. Previously, the coverage accumulation process kept a count of how many pixels were visited within each pixel array by a single primitive. A flag was also kept that indicated pixel by pixel, that all pixels (or sub-pixels) were claimed and that they were opaque. In the enhanced fill buffer approach two different sets of pixel counts and opacity flags are accumulated. The first set accumulates the coverage of a pixel array by the current primitive only. The current pixel count accumulator 60 and opacity flag accumulator 62 can then be saved and recalled when the next connected primitive encounters the same pixel array.

Figure 4:
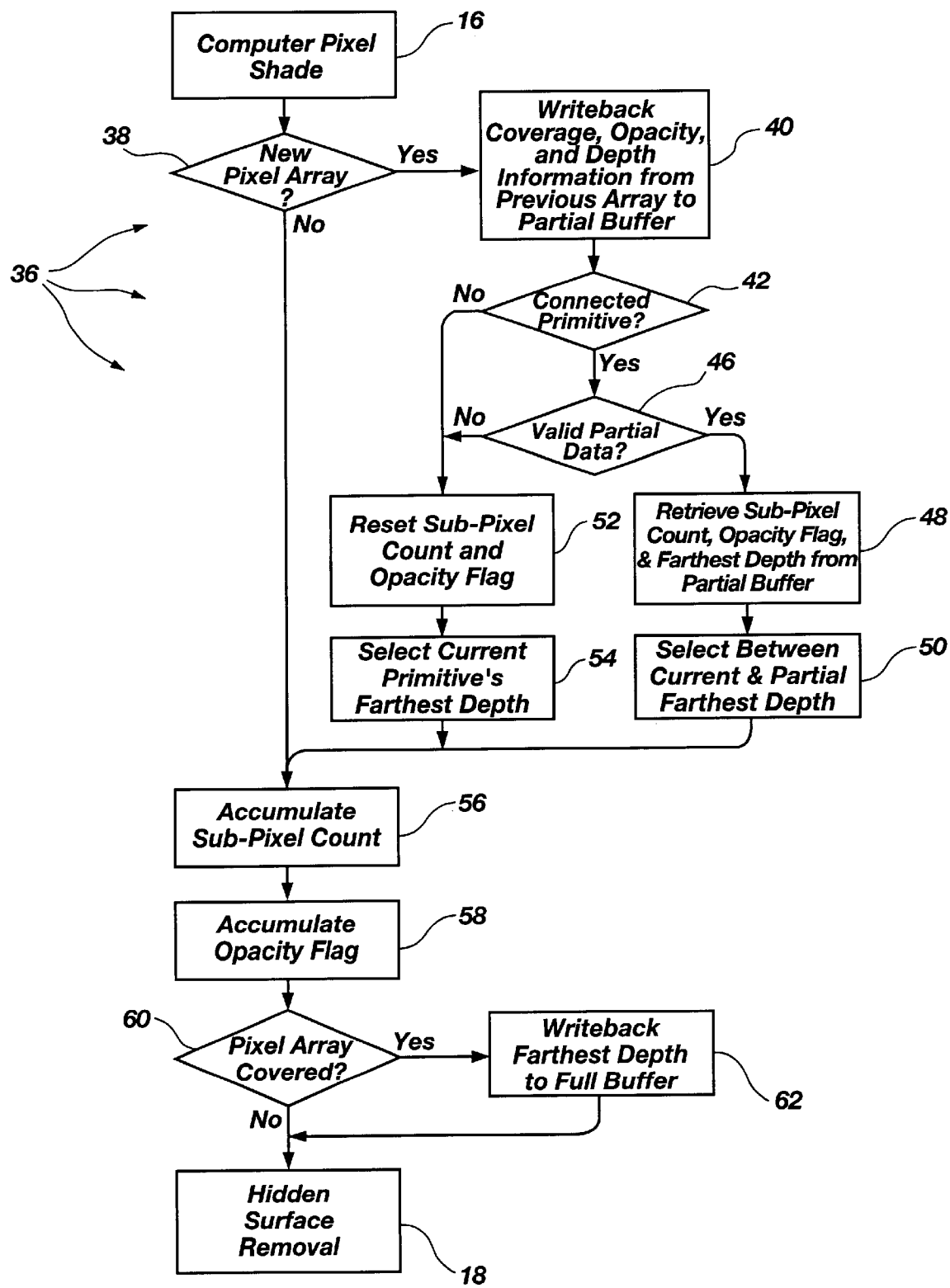
FIG. 4 is a partial flow diagram of the enhanced full buffer process of the present invention.

The second set accumulates the coverage of a pixel array by not only the current primitive but also contributions from the previous primitive in a connected primitive. Instead of counting pixels from zero, the connected primitive begins its count where its neighbor primitive left off. Because of the complementary nature of shared edges previously described, the new pixels are guaranteed to be unique. This enhanced coverage accumulation method is shown in FIG. 4. It should be recognized that someone skilled in the art could rearrange the steps in this method, which are not dependent on other steps. The steps shown are illustrative of one embodiment of this invention.

FIG. 4 expands step 36 from FIG. 3, regarding the accumulation of pixel array coverage, to cover the enhanced full buffer approach When each new pixel array is encountered at step 38, the pixel (or sub-pixel) count and the opacity flag accumulated for the current primitive in the previous pixel array are stored in the corresponding location in the partial buffer, as shown in step 40. The farthest depth of the current primitive within the previous pixel array is also stored in the partial buffer, at step 40. This information is validated by setting the partial buffer's current valid flag 88 for the previous pixel array.

Second, the pixel count and opacity flags for the current primitive or current accumulators within the new pixel array are reset at step 40. The pixel and opacity accumulators 90, 92 (shown in FIG. 5) for the combined effect of the current and previous primitives ("combined accumulators") must also be loaded. If the current primitive is a connected one, as determined at 42, and valid data exists in the partial buffer for this pixel array, tested at 46, the combined accumulators are loaded with the data from the partial buffer. If this is not a connected primitive or no valid data exists in the partial buffer, the combined accumulators are reset at step 52 just like the current accumulators.

Third, a determination must be made at step 50 as to the farthest depth within the pixel array. A single depth within the pixel array is computed per primitive and this depth is found at the appropriate corner of the array. The primitive's slope value is used to identify which corner will yield the farthest depth value for the current primitive. The depth value of the current primitive is stored in the partial buffer 64 when a new pixel array is encountered. The farthest depth 80 that is stored in the full buffer 72 may be different than the farthest depth 70 of the partial buffer 64. Because two primitives may combine to fill a pixel array and we only compute a single depth value within the array per primitive, a comparison must be done between the two possible depths at steps 50, 54. If this is not a connected primitive or no valid data exists in the partial buffer, the farthest depth of the current primitive within the pixel array is selected at 54.

If the current primitive is a connected one, determined at step 42 and valid data exists in the partial buffer for this pixel array, reflected at 46, a comparison is done at step 50 between the depth 70 retrieved from the partial buffer and the farthest depth 63 of the current primitive within the pixel array. The farther of these two is selected as the combined farthest depth 93, as shown in FIG. 5.

For each pixel scanned into the pixel array, the number of pixels covered by the primitive is added to both the combined pixel count accumulator 90 and current pixel count accumulator 60. The combined pixel count accumulator 90 keeps the total number of pixels touched by both the previous and current primitive within the pixel array. The output of the combined pixel count accumulator 90 is used to determine if the pixel array is completely covered. The current pixel count accumulator 60 keeps the total number of pixels touched by just the current primitive.

The opacity of the pixels is also accumulated. If any pixel touched by the primitive within the pixel array is not opaque, the current opacity flag accumulator 62 is cleared and remains cleared. Like the pixel count, both a combined opacity flag and current opacity flag are tracked in the respective accumulators. Obviously, partially transparent primitives must not mark the pixel array full since more distant primitives may still be visible through the pixels.

The combined pixel count in accumulator 90 and combined opacity flags in accumulator 92 are monitored to see if the pixel array becomes completely covered. If so, the farthest depth value 93 within the pixel array may be loaded back into the full buffer 72. If the primitive (or connected primitive) completely fills the array, and its farthest depth is closer than the one already in the full buffer, the new depth will overwrite the old value. Thus, the full buffer 72 gets refined with closer and closer primitives as needed in order to reject more of the database and skip the processing of pixel arrays. Thus, sending primitives in a front-to-back order can greatly impact the performance. If the closest primitives are rendered first, they will record the closer depth values and thereby cause even more distant primitives to be quickly rejected.

The preferred embodiments of the invention have been described above, but it is to be understood that these embodiments are only illustrative of the applied principles of the present invention. Numerous modifications and alternative arrangements may be devised by those skilled in the art without departing from the spirit and scope of the invention. The appended claims are intended to cover such modifications and arrangements.

What is claimed is:

1. A computer graphics rendering system for efficiently rendering three-dimensional scenes of high depth complexity with a graphics display unit, comprising:
    (a) means for bypassing rendering operations for frame buffer regions in which the pixels are completely covered by primitives,
    (b) means for accumulating coverage of frame buffer regions by both individual primitives and groups of primitives,
    (c) a full buffer having memory locations arranged for recording frame buffer regions which are completely covered, and
    (d) a partial buffer coupled to the full buffer to enable multiple primitives to combine to fill frame buffer regions.

2. The graphics rendering system of claim 1 and further comprising means for copying pixel array coverage information to the partial buffer for later use by adjacent primitives.

3. The graphics rendering system of claim 1 and further comprising means for determining whether the current primitive in the sequence is connected to the previous primitive; means for determining when the combined coverage of primitives has filled the frame buffer region, and means for recording that coverage in the full buffer.

4. The graphics rendering system as in claim 2 where the partial buffer further comprises:
    (a) a plurality of pixel count values in the partial buffer wherein each corresponds to a pixel array in the partial buffer to thereby store the number of pixels covered in the pixel array by the previously scanned primitive for the pixel array,
    (b) a plurality of opacity flags in the partial buffer wherein each opacity flag corresponds to a pixel array in the partial buffer which indicates if all the pixels counted by the current pixel count accumulator were opaque; and (c) a plurality of farthest depth values in the partial buffer wherein each depth storage location corresponds to a pixel array in the partial buffer to thereby store the farthest depth value of the most recently processed primitive within the pixel array.

5. The graphics rendering system as in claim 4 where the means for copying further includes a means for copying the accumulated values from the partial buffer further comprises a means for copying the pixel count value from the partial buffer to the combined pixel count accumulator, and the opacity flags from the partial buffer to the combined opacity flag accumulator, and the farthest depth value to the combined farthest depth value.

6. The graphics rendering system as in claim 5 where the means for determining when a next connected primitive has combined with results in the partial buffer to fill pixel arrays further comprises:

(a) a plurality of valid flag pairs in the partial buffer wherein each pair of valid flags is a current and previous flag and corresponds to a pixel array in the partial buffer such that partial buffer appears double buffered even though there is only one memory location per pixel array which stores pixel values, (b) a means for determining whether the data in the partial buffer is valid such that the next step of combining the partial buffer coverage information is skipped if the partial buffer data is not valid.

7. The graphics rendering system as in claim 6 further comprising a plurality of coincident full flags in the fill buffer wherein each coincident full flag corresponds to a pixel array in the full buffer to thereby indicate that a pixel array has been filled by one or more coincident primitives and the pixel array calculations to determine pixel values may be skipped if other coincident primitives within the same coincident group are encountered.

8. The graphics rendering system as in claim 5 further comprising a combined pixel count accumulator coupled to the partial buffer and the current primitive, to thereby determine the total number of pixels in the pixel array filled by both the previous connected primitive recorded in the partial buffer and the current connected primitive.

9. The graphics rendering system as in claim 5 further comprising a combined opacity flag accumulator coupled to the partial buffer and the current primitive, wherein each opacity flag corresponds to a partial buffer and a full buffer pixel array and stores a true value if all pixel values in the corresponding pixel arrays are opaque and a false value if any pixel value is transparent.

10. A computer graphics rendering process for efficiently rendering three-dimensional scenes of high depth complexity with a graphics display unit, comprising:

(a) bypassing rendering operations for frame buffer regions which are completely covered, (b) accumulating coverage of frame buffer regions by both individual primitives and groups of primitives, (c) recording frame buffer regions which are completely covered using a full buffer having memory locations, and (d) combining multiple primitives to fill frame buffer regions using a partial buffer coupled to the full buffer.

11. The method for rendering graphics as in claim 10 and further comprising the steps of skipping the next pixel array in the sequence if the pixel array in the full buffer is already filled with rendered pixel values; and analyzing whether the next pixel array is a new pixel array wherein the pixel array has not been filled with any pixel values.

12. The method for rendering graphics as in claim 10 and further comprising the step of analyzing whether the primitive currently being scanned is connected to the primitive which was previously scanned.

13. The method for rendering graphics as in claim 12 where the step of analyzing whether the primitive currently being scanned is connected to the primitive which was previously scanned further comprises the step of marking the pixel array data as valid.

14. The method for rendering graphics as in claim 12 where the step of transferring the current accumulator data to the partial buffer further comprises: transferring the pixel count value, opacity flag, and farthest depth value for a current primitive to a corresponding pixel count opacity flag, and farthest depth value in the partial buffer.

15. The method for rendering graphics as in claim 14 where the step of retrieving the information stored in the partial buffer further comprises the next step of selecting between the currently scanned primitive depth and partial buffers primitive depth value.

16. The method for rendering graphics as in claim 12 where the step of combining both the current primitive data and the partial buffer if their combined pixels cover a whole pixel array comprises the next steps of:

(a) incrementing to the combined pixel count accumulator and the current pixel count accumulator;

(b) marking combined opacity flag and the current opacity flag to thereby store a value which shows whether all the pixels in the pixel array are opaque; and (c) analyzing the combined pixel accumulator and combined opaque flags to determine if the pixel array is completely filled with pixel values.

17. The method for rendering graphics as in claim 16 which further comprises the step of storing the farthest depth in the full buffer if the pixel array is completely filled.

18. The method for rendering graphics as in claim 13 where the steps of retrieving the information and combining the partial buffer and the current primitive are skipped if the primitives are not connected and further comprising the steps of:

(a) overwriting the combined pixel count accumulator with data from the current pixel count accumulator;

(b) overwriting the combined opacity flag with the current opacity flag to thereby store a value which shows whether all the pixels in the pixel array are opaque relative to only the current primitive; and (c) overwriting the combined farthest depth value with the current primitive's farthest depth.

19. A method for rendering graphics as in claim 18 where the next steps comprise:

(a) testing to decide if the pixel array is filled;

(b) storing the farthest depth of the currently scanned primitive in the full buffer if the pixel array is filled;

(c) selecting a new primitive to be scanned; and (d) repeating all the above steps until all the primitives have been scanned for all the pixel arrays.

20. A method for rendering graphics as in claim 12 wherein it is determined that the current primitive and next primitive to be scanned are not connected, further comprising the steps of:

(a) skipping over the partial buffer operations;

(b) resetting the pixel count accumulator;

(c) selecting the current primitives furthest depth;

(d) accumulating the pixel count and the opacity flag;

(e) testing to decide if the pixel array is filled;

(f) storing the farthest depth of the primitive in the full buffer if the pixel array is filled;

(g) selecting a new primitive to be scanned by the graphics systems and repeating the steps above.

21. A method for rendering graphics as in claim 12 wherein it is determined that the current primitive and next primitive to be scanned are connected, further comprising the steps of:

(a) determining that the partial buffer data is valid;

(b) retrieving the sub-pixel count, opacity flag and farthest depth from the partial buffer;

(c) selecting between current and partial farthest depth;

(d) accumulating the pixel count and the opacity flag;

(e) testing to decide if the pixel array is filled;

(f) storing the farthest depth of the primitive in the full buffer if the pixel array is filled;

(g) selecting a new primitive to be scanned by the graphics systems and repeating the steps above.

22. A method for increasing a rate of rendering a synthetic image on a computer graphics display, wherein the synthetic image is generated from a database of a plurality of primitives, said method comprising the steps of:

(a) determining which pixels require processing for each of the plurality of primitives;

(b) comparing the depth values of the primitives requiring processing against depth values in a full buffer to thereby determine whether the pixels in a region require further processing; and (c) skipping shading value calculations for pixels not requiring further processing.

23. The method of claim 22 wherein the method further comprises the step of determining a closest pixel depth to each of the plurality of primitives being rendered.

24. The method as defined in claim 23 wherein the method further comprises the steps of:

(a) determining a closest vertex relative to an observer of each of the primitives being rendered; and (b) determining a closest value for the primitive within a given pixel array.

25. The method as defined in claim 24 wherein the step of determining a closest vertex relative to the observer of each of the primitives being rendered further comprises the step of comparing depth values at each vertex of the primitive to thereby locate a closest depth value.

26. The method as defined in claim 24 wherein the step of determining a closest value for the primitive within a given pixel array further comprises the steps of:

(a) determining whether a closest point within the pixel array has a further depth value than the closest vertex of a primitive; and (b) utilizing the depth value of the closest array corner for the full buffer test if the closest array comer is further than the closest vertex of the primitive; and (c) utilizing the depth value of the closest vertex of the primitive if the closest array comer is not further than the closest vertex of the primitive.

27. The method as defined in claim 26 wherein the step of determining whether the closest value for the primitive within a given pixel array has a further depth value than a closest vertex further comprises the step of utilizing a depth slope comparison.

28. The method as defined in claim 27 wherein the method further comprises the step of making a sign bit comparison to determine at which comer the depth value is to be calculated.

29. The method as defined in claim 28 wherein the method further comprises the steps of:

(a) comparing the closest depth value with a depth value already stored in the full buffer for each pixel array requiring processing for the primitive;

(b) bypassing the array if the depth value is further than the recorded depth in the full buffer; and (c) processing the pixel array to determine a shading value for each pixel and executing z-buffer testing, if the depth value is closer than the recorded depth in the full buffer.

30. The method as defined in claim 29 wherein the method further comprises the steps of:

(a) monitoring a rendering process to determine whether the primitives which are being recorded in the frame buffer completely fill any pixel arrays of the full buffer being processed;

(b) loading a maximum depth value of a primitive into the full buffer if the pixel array is completely filled; and (c) overwriting an old full buffer depth value if the primitive completely fills the array, and the maximum depth value is closer than the depth value already in the buffer.

31. A method for increasing a rate of rendering a synthetic image on a computer graphics display, wherein the synthetic image is generated from a database of a plurality of primitives, said method comprising the steps of:

(a) determining which pixels of the plurality of pixels require processing for each of the plurality of primitives;

(b) serially accumulating a full status of a plurality of pixels stored in at least one pixel array as the plurality of pixels are processed; and (c) marking the pixel array as full if the plurality of pixels in the pixel array are determined to be completely covered.

32. The method as defined in claim 31 wherein the method further comprises the step of comparing the depth value of the primitives requiring processing against the depth values in a full buffer to thereby determine whether the pixels in a region require further processing and skipping shading of the pixels if the depth value of the primitives is greater than the depth values in the full buffer.

33. The method as defined in claim 31 wherein the method further comprises the step of determining a furthest pixel depth relative to each of the plurality of primitives being rendered.

34. The method as defined in claim 33 wherein the method further comprises the step of determining a furthest value for the primitive within a given pixel array.

35. The method as defined in claim 34 wherein the step of determining a furthest value for the primitive within a given pixel array further comprises utilizing the depth value of the furthest array comer for the full buffer test.

36. The method as defined in claim 34 wherein the step of determining the furthest value for the primitive within a given pixel array further comprises the step of utilizing a depth slope comparison.

37. The method as defined in claim 36 wherein the method further comprises the step of making a sign bit comparison to determine at which comer the depth value is to be calculated.

38. The method as defined in claim 37 wherein the method further comprises the step of determining the furthest depth value to store in the full buffer when primitives which are not bypassed fill an array region in the full buffer.

39. A system for increasing a rate of rendering a synthetic image on a computer graphics display, where the synthetic image is generated from a database of a plurality of primitives, comprising:

(a) means for determining which pixels require processing for each of the plurality of primitives;

(b) means for comparing the depth values of the primitives requiring processing against depth values in a full buffer to thereby determine whether the pixels in a region require further processing; and (c) means for skipping shading value calculations for pixels not requiring further processing.

40. The system of claim 39 and further comprising means for determining a closest pixel depth to each of the plurality of primitives being rendered.

41. The method as defined in claim 40 and further comprising (a) means for determining a closest vertex relative to an observer of each of the primitives being rendered; and (b) means for determining a closest value for the primitive within a given pixel array.

* * * * *

UNITED STATES PATENT AND TRADEMARK OFFICE
CERTIFICATE OF CORRECTION

PATENT NO.   : 6,362,818 B1
DATED        : March 26, 2002
INVENTOR(S)  : Gardiner et al.

It is certified that error appears in the above-identified patent and that said Letters Patent is hereby corrected as shown below:

<u>Title page,</u>
Item [63], should read as:
-- [63]   Continuation-in-part of application No. 09/003,938,
          filed on January 7, 1998, now Pat. No. 6,052,125. --

Signed and Sealed this

Twenty-ninth Day of October, 2002

*Attest:*

*Attesting Officer*

JAMES E. ROGAN
*Director of the United States Patent and Trademark Office*